US008616446B2

(12) United States Patent
Ludlow et al.

(10) Patent No.: US 8,616,446 B2
(45) Date of Patent: *Dec. 31, 2013

(54) DYNAMIC IDENTITY MATCHING IN RESPONSE TO THREAT LEVELS

(71) Applicant: Intellicheck Mobilisa, Inc., Port Townsend, WA (US)

(72) Inventors: Nelson Ludlow, Port Townsend, WA (US); Steve Zehm, Port Hadlock, WA (US)

(73) Assignee: Intellicheck Mobilisa, Inc., Port Townsend, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,062

(22) Filed: Dec. 4, 2012

(65) Prior Publication Data

US 2013/0117283 A1    May 9, 2013

Related U.S. Application Data

(63) Continuation of application No. 11/843,621, filed on Aug. 22, 2007, now Pat. No. 8,322,605.

(51) Int. Cl.
*G06K 5/00* (2006.01)

(52) U.S. Cl.
USPC ....... 235/380; 235/375; 235/382; 235/462.01

(58) Field of Classification Search
USPC .............................. 235/375, 380, 382, 462.01
See application file for complete search history.

(56) References Cited

U.S. PATENT DOCUMENTS

| | | | |
|---|---|---|---|
| 6,779,721 B2 | 8/2004 | Larson et al. | |
| 6,785,405 B2 | 8/2004 | Tuttle et al. | |
| 7,003,669 B2 | 2/2006 | Monk | |
| 7,110,573 B2 | 9/2006 | Monk et al. | |
| 7,119,553 B2 | 10/2006 | Yang et al. | |
| 7,212,113 B2 | 5/2007 | Zanovitch | |
| 7,244,043 B2 | 7/2007 | Monk et al. | |
| 7,277,891 B2 | 10/2007 | Howard et al. | |
| 7,599,847 B2 | 10/2009 | Block et al. | |
| 7,631,805 B2 | 12/2009 | Larson et al. | |
| 8,322,605 B2* | 12/2012 | Ludlow et al. | ............... 235/380 |
| 2003/0225687 A1 | 12/2003 | Lawrence | |
| 2004/0078335 A1 | 4/2004 | Calvesio et al. | |
| 2005/0187677 A1 | 8/2005 | Walker | |
| 2006/0157559 A1 | 7/2006 | Levy et al. | |
| 2006/0184575 A1 | 8/2006 | Singleton | |

OTHER PUBLICATIONS

International Search Report and Written Opinion for International Application No. PCT/US08/74119; Applicant Mobilisa, Inc.; Date of Mailing: Jan. 2, 209 (12 pages).

(Continued)

*Primary Examiner* — Kristy A Haupt
(74) *Attorney, Agent, or Firm* — Perkins Coie LLP (57) ABSTRACT

A dynamic identity matching facility that enables an operator to determine the status of an individual based on identification information contained on an identification record provided by the individual. The operator scans the individual's identification information from the identification record using a scanning device. The facility decodes the scanned identification information and identifies a number of candidates based on the decoded identification information. For each identified candidate, the facility generates a candidate score. Based on the candidate score of each identified candidate, the facility selects a number of the identified candidates for display. The facility displays the selected candidates to the operator along with the candidate's criminal or other acts.

35 Claims, 5 Drawing Sheets

(56) References Cited

OTHER PUBLICATIONS

Kim et al.; "Experience with Tripwire: Using Integrity Checkers for Intrusion Detection". In Systems Administration, Networking and Securing Conference III (Usenix, 1994 [online]). Published Feb. 21, 1994 [retrieved on Dec. 18, 2008]. Retrieved from the Internet: <URL http://ftp.cerias.purdue.edu/pub/papers/Everything/Tripwire-SANS.pdf>, 13 pages.

Latanya Sweeney, Towards a Privacy-Preserving Watchlist Solution. *AAAI Spring Symposium*, AI Technologies for Homeland Security, 2005, 1 page.

Robert O'Harrow Jr., Air Security Focusing on Flier Screening. Washington Post, Sep. 4, 2002, 5 pages.

\* cited by examiner

DYNAMIC IDENTITY MATCHING IN RESPONSE TO THREAT LEVELS

CROSS-REFERENCE TO RELATED APPLICATION

This application is a continuation of, and claims the benefit of, U.S. patent application Ser. No. 11/843,621, entitled "DYNAMIC IDENTITY MATCHING IN RESPONSE TO THREAT LEVELS," filed Aug. 22, 2007, which is incorporated herein by reference in its entirety.

BACKGROUND

Identity matching systems have been used in a range of settings to control access to secure locations, protect information against security breaches, and to detect individuals who pose a threat to public safety. For example, the National Crime Information Center (NCIC) provides a database of criminal records that may be used to assist law enforcement in apprehending fugitives. A law enforcement officer can submit a request to the NCIC during a traffic stop to determine whether the driver of the vehicle is wanted under an outstanding warrant or citation. However, NCIC inquiries frequently result in false positives that require the requesting officer to investigate further before any action can be taken. Consequently, because the NCIC system requires additional time and resources, it is inefficient for use in routine screening environments where large numbers of individuals need to be processed in a short amount of time.

The Computer-Assisted Passenger Prescreening System (CAPPS) is another example of an identity matching system that has been used to detect individuals who may pose a terrorist-related threat or who have outstanding Federal or state warrants for violent crimes. CAPPS assesses the identity of a passenger by matching passenger name information to government databases in order to determine if there is an exact (or near exact) name match. CAPPS relies on a simple matching algorithm to match the passenger's name with a name list. Matching algorithms that rely only upon a name are likely to generate a high number of false positives, such as publicized cases of Transportation Security Agency (TSA) employees stopping famous people or 2-year olds whose name happens to match the same name on a terrorist list.

DETAILED DESCRIPTION

Accuracy and efficiency are critical factors to the success and adoption of an identity matching system. In light of the recent security threats in the world, there is a large unmet need to provide better access control at the county's borders, at sensitive installations, and at public and private venues. Accordingly, an identity matching facility that is highly accurate and allows individuals to be processed in a short timeframe is disclosed herein. The identity matching facility is dynamic and responsive to environmental information, such as threat levels issued by the military or the Department of Homeland Security (DHS).

A dynamic identity matching facility is disclosed that enables an operator to determine the status of an individual based on identification information contained on an identification record provided by the individual. The operator scans the individual's identification information from the identification record using a scanning device. The facility decodes the scanned identification information and identifies a number of candidates based on the decoded identification information. For example, the facility may identify a number of candidates using a name matching algorithm. For each identified candidate, the facility generates a candidate score. Based on the candidate score of each identified candidate, the facility selects a number of the identified candidates for display. For each selected candidate that the facility recognizes as a person of interest, the facility selects the candidate's criminal acts (or other acts) for display. The facility displays the selected candidates to the operator.

In some embodiments, the facility employs a fuzzy matching technique to identify candidates based on the decoded identification information. For example, the facility may identify and analyze candidate names that are spelled slightly differently than the name provided by the decoded identification information.

In some embodiments, the candidate score for each identified candidate is the aggregate result of a multi-factored test. For example, the candidate score may be the aggregate of one or more scores relating to the identified candidate's gender, date of birth (DOB), physical description, or other identifying aspect. In some embodiments, fuzzy matching techniques may be used in calculating the candidate score for each identified candidate. For example, a candidate DOB that exactly matches the DOB provided by the decoded identification information may receive a higher score than a candidate DOB that matches the day and month yet does not match the year of the DOB provided by the decoded identification information.

In some embodiments, the candidate score includes a score that is calculated according to the frequency of the candidate's name within a population. For example, a candidate name having a high frequency within a population (e.g., John Smith) may receive a lower score than a candidate name having a low frequency within the population (e.g., Walentia Knapek).

In some embodiments, the number of identified candidates selected for display by the facility is based on environmental information known or retrieved by the facility. For example the facility may obtain the environmental information from an external service, such information may include threat levels issued by the military or DHS. When the threat level is high, the facility may display additional candidates to the operator. In some embodiments, the user interface is configurable. The facility may display multiple candidates or acts (criminal or other) to the operator.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid any unnecessarily obscuring the relevant description of the various embodiments.

Figure 1:
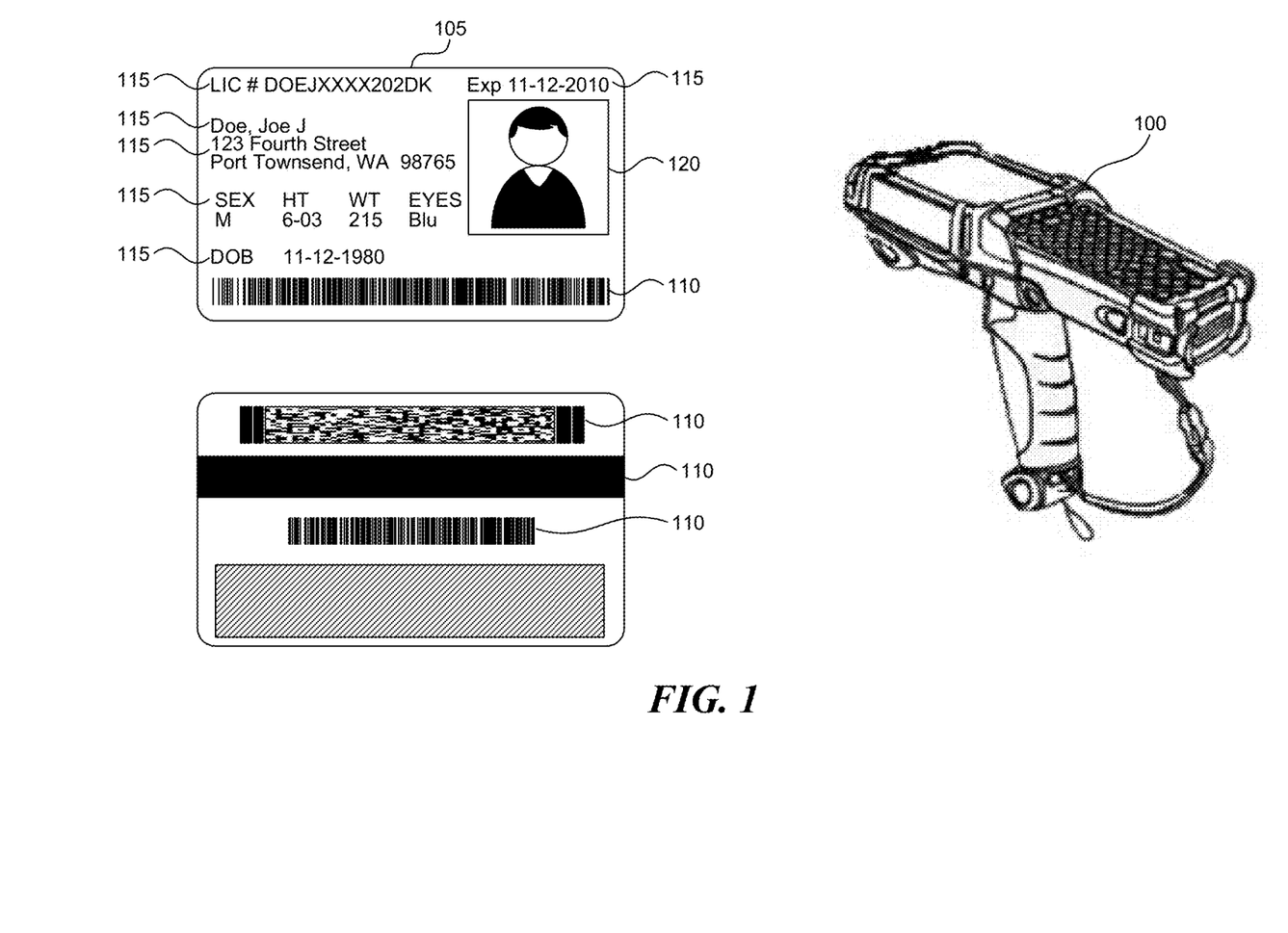
FIG. 1 illustrates a scanning device that may be used to scan an identification record containing machine-readable identification information.

FIG. 1 illustrates a scanning device 100 that may be used to scan an identification record 105 containing machine-readable identification information 110. When an individual provides an operator of scanning device 100 with identification record 105, the operator may scan the identification record and determine the status of the individual. With scanning device 100, for example, the operator may determine that the individual is a suspected terrorist, has an outstanding warrant, or is otherwise wanted by the authorities. Further details about the scanning device will be provided herein.

Identification record 105 may be a driver's license or other form of identification record containing machine-readable identification information 110. In some embodiments, for example, identification record 105 may be a military or federal government identification document ("ID"), state or local government ID, passport, RFID chip, or corporate ID. In some embodiments, the identification record includes one or more portions of human-readable information 115. Identification record 105 may include information such as the individual's name, address, DOB, signature, or physical characteristics. In some embodiments, identification record 105 includes a photograph 120 of the individual. The information on the identification record may be stored as human-readable information, as machine-readable information, or as both human-readable and machine readable information.

Figure 2:
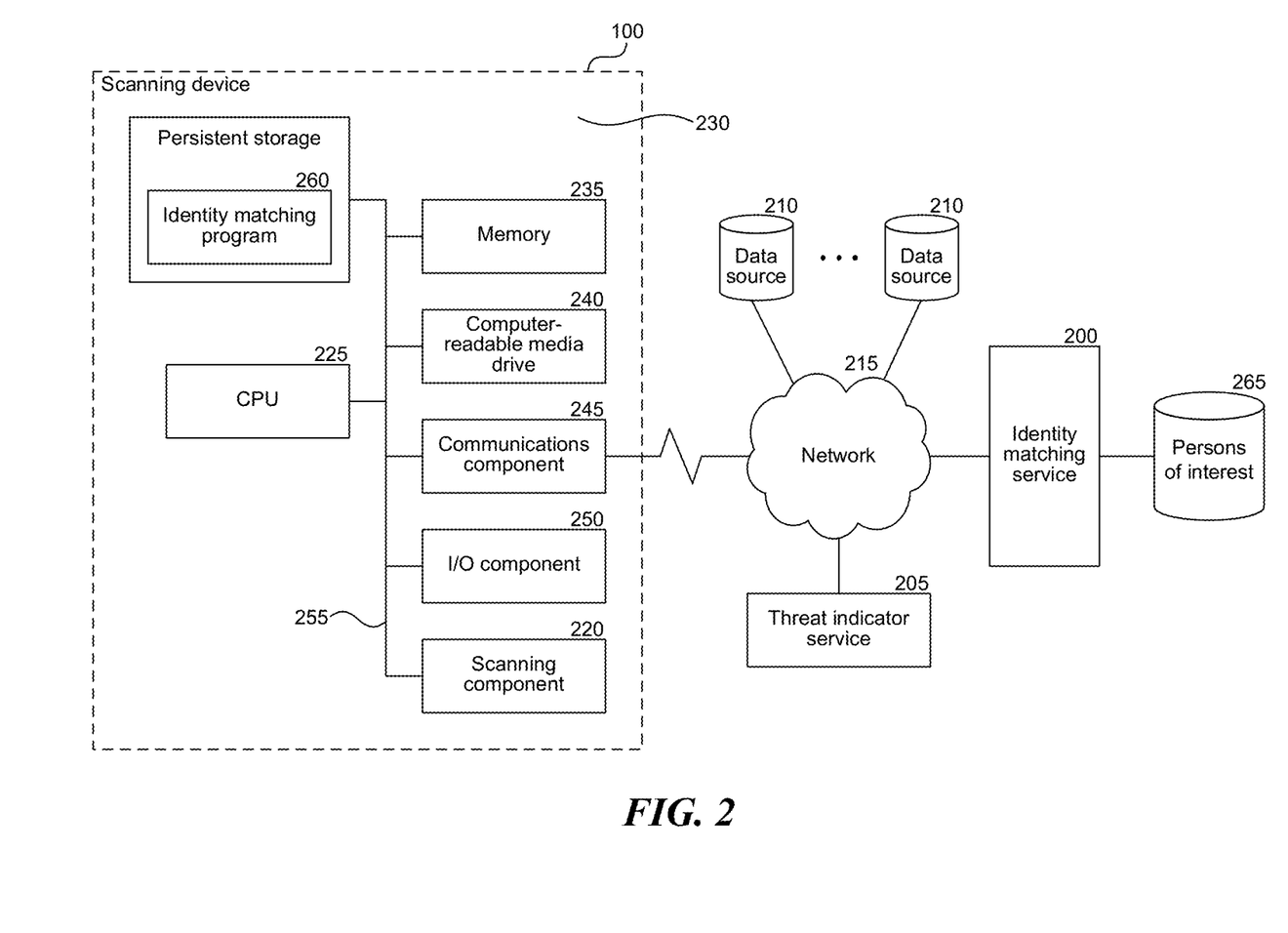
FIG. 2 is a block diagram that illustrates various components or services that are part of or interact with a dynamic identity matching facility.

FIG. 2 is a block diagram that illustrates various components or services that are part of or interact with a dynamic identity matching facility. A scanning device 100, an identity matching service 200, a threat indicator service 205, and a plurality of data sources 210 may exchange data through a wired or wireless network 215 in order to enable the facility to dynamically identify persons of interest.

Scanning device 100 shows some of the components that may be incorporated in a device on which the facility executes. Scanning device 100 includes one or more scanning components 220. For example, the scanning device may include a digital scanner, a magnetic reader, a one-dimensional ("1D") bar code scanner, a two-dimensional ("2D") bar code scanner, an RFID reader, or other scanning component. The scanning device may also include one or more central processing units (CPUs) 225 for executing computer programs; a persistent storage component 230, such as a hard drive for persistently storing programs and data; a computer memory 235 for storing programs and data while they are being used; a computer-readable media drive 240 for reading programs and data stored on a computer-readable medium; a communications component 245 for connecting the scanning device to other computer systems; and one or more input/output components 250, such as a display, keyboard, or touch screen; all of which may exchange data via a bus 255 or other communication path. While scanning devices configured as described above are typically used to support the operation of the facility, those skilled in the art will appreciate that the facility may be implemented using devices of various types and configurations, and having various components.

In some embodiments, scanning device 100 executes an identity matching program 260 to determine the status of an individual based on the scanned identification information. Information records identifying persons of interest may be stored locally on scanning device 100 and/or be accessed remotely by the scanning device. For example, the scanning device may include a database (not shown) containing identification records from one or more data sources, such as identification records mirrored from a remote data store 265. As another example, the scanning device may not maintain a local database and instead may access remote data store 265 through a public or private network 215. The persons of interest data store is a database of individuals having one or more criminal or other acts that cause them to raise heightened concern for security purposes. In addition to a record of the criminal and other acts of each individual, the persons of interest data store includes typical characterizing information about the individual, such as a picture, name, DOB, gender, height, weight, eye color, address, etc.

The information records contained in the persons of interest data store are used by the identity matching program to identify individuals of interest. In some embodiments, the facility calls a remote identity matching service 200 to determine the status of an individual based on the scanned identification information. In some embodiments, the facility may invoke a local identity matching program 260 to determine the status of an individual based on the scanned identification information. It will be appreciated that the identity matching service and the identity matching program may also work in combination to process identity information and identify individuals of interest. The actions taken by the facility to determine the status of an individual is described further herein.

While various embodiments are described in terms of the environment described above, those skilled in the art will appreciate that the facility may be implemented in a variety of other environments including a single monolithic computer system, as well as various other combinations of computer systems or similar devices connected in various ways.

Figure 3:
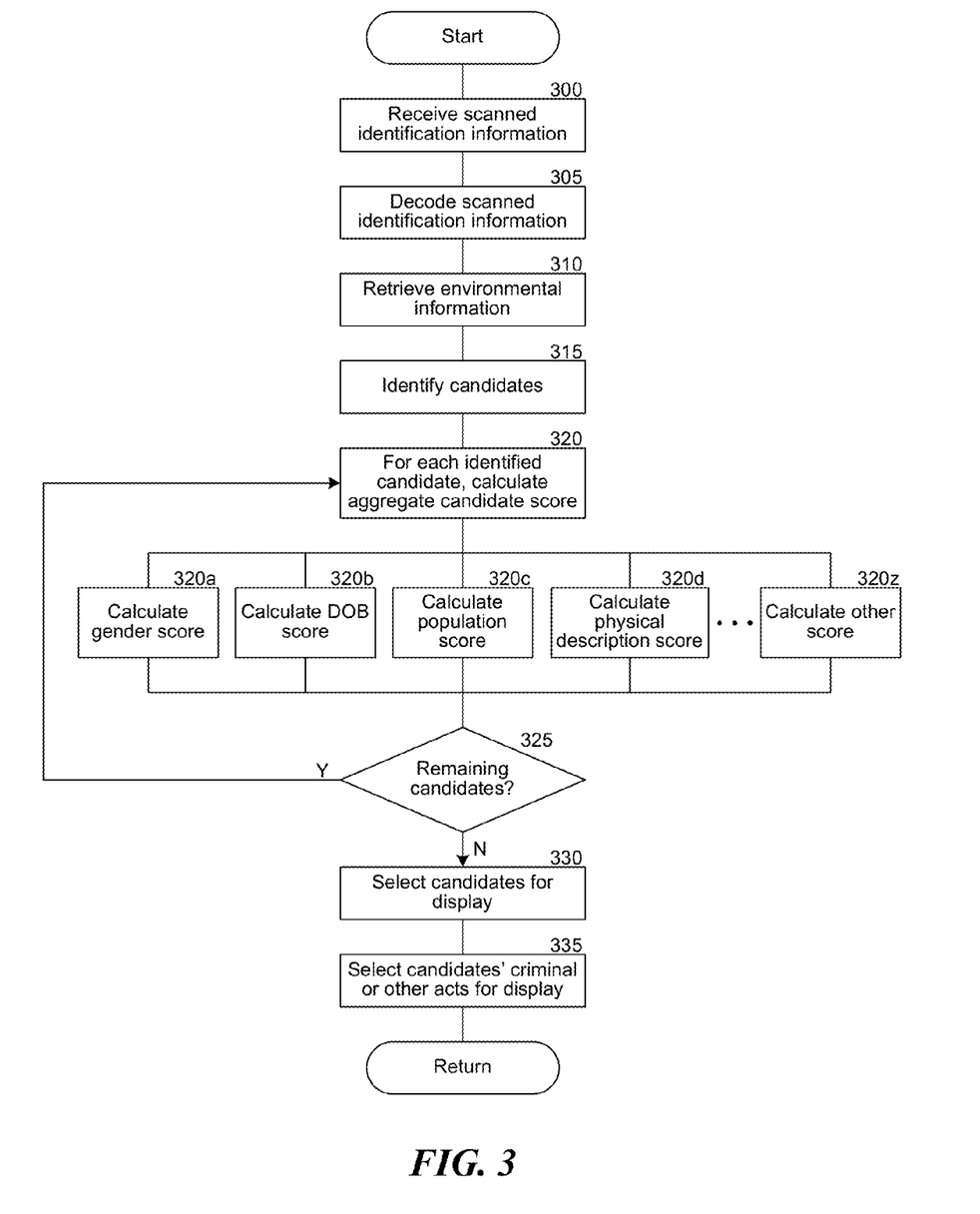
FIG. 3 is a flow chart of actions performed by the facility to identify persons of interest based on identification information.

FIG. 3 is a flow chart showing actions performed by the facility to identify persons of interest based on identification information. At block 300 the facility receives scanned identification information. At block 305, the facility decodes the scanned identification information. In some embodiments, the facility parses the decoded identification information into one or more query fields. For example, when an operator scans identification record 105 containing machine-readable identification information 110, the facility may parse the decoded information into a query name field, query license number field, query DOB field, query image field, query gender field, query height field, query weight field, query eye color field, query address field, et cetera.

At block 310, the facility retrieves environmental information. Environmental information may be retrieved from local or remote data sources. For example, the facility may ascertain the threat level issued by DHS. The Homeland Security Advisory System is a color-coded threat advisory scale, consisting of five color-coded threat levels: red (severe risk), orange (high risk), yellow (significant risk), blue (general risk), and green (low risk). The different levels trigger specific actions by federal agencies and state and local governments. Typical actions include increasing police and other security presence at landmarks and other high-profile targets, more closely monitoring international borders and other points of entry, etc. The facility may ascertain environmental information from a number of agencies and/or news facilities, and is not limited to DHS. As another example, the facility may retrieve the details of an AMBER Alert.

The environmental information used by the facility may be updated in real-time, in near real-time, or on a periodic or sporadic basis. For example, the facility may send a query to a service to receive the threat level issued by DHS each time that it receives scanned identification information. As another example, the facility may receive a periodic (e.g., hourly, daily) data feed from the DHS or from another service that contains the threat level. The threat level is stored by the facility and continued to be used until an updated threat level is received. As yet another example, the threat level may be queried by the facility on a daily basis and used until a new threat level is obtained.

The environmental information considered by the facility may be a single threat level provided by a service, or it may encompass multiple piece of information derived from a variety of sources. For example, the facility may take into account a national government threat level, a time of day, a regional warning, and a report of two incidents (e.g. robberies) that took place in proximity to the scanning device. The facility may apply various weighting factors to each of the pieces of information to arrive at an overall assessment of the threat level for subsequent processing.

At block 315, the facility identifies a number of potential candidates that match the identity of the individual with the ID based on the decoded identification information. The facility identifies candidates based on how closely the candidate name matches the query name. In some embodiments, the facility identifies the candidates using a fuzzy name matching algorithm. The identified candidates may match the decoded identification information exactly or approximately. The facility may use a number of techniques individually or in combination to identify candidates. For example, the facility may identify candidates using the bitap algorithm. The bitap algorithm is a fuzzy matching algorithm that determines whether a query string is approximately equal to a selected string based on the minimum number of operations necessary to transform one string into the other, where an operation is an insertion, deletion, or substitution of a single character. If the query string and pattern are within a predefined distance k of each other, then the bitap algorithm considers them approximately equal.

In some embodiments, the facility identifies the candidates by phonetically encoding the decoded identification information to capture its phonetic representation. The Soundex algorithm or International Phonetic Alphabet (IPA) algorithm are examples of phonetic algorithms that may be used to normalize spelling errors or detect variants. In some embodiments, the facility selects a phonetic algorithm based on the origin of the query name. The facility may also identify candidates by considering variants of a query name; for example, Finetta is a variant of Josephine.

The number of candidates identified by the facility may be predefined. For example, the facility may be configured to identify a minimum or maximum number of candidates. In some embodiments, the number of identified candidates is based on environmental information known or retrieved by the facility. For example, the facility may identify a greater number of candidate records when the threat level is high, and a lesser number of candidates when the threat level is low. By varying the number of candidates that are identified for processing by the facility, the facility may increase the likelihood of locating a match. A greater number of candidates, however, may result in lengthier processing times that could potentially impact the number of individuals that can be processed by an operator.

At block 320, for each identified candidate, the facility generates a candidate score based on the sum of scores calculated at blocks 320a, 320b, . . . 320z. Each of the scores calculated at blocks 320a, 320b, . . . 320z may be weighted depending on how strongly the score is correlated with a potential candidate match. The overall candidate score indicates how likely the candidate record and the scanned identification record identify the same individual.

At block 320a, the facility calculates a gender score based on how closely the candidate's gender matches the query gender. For example, when the candidate's gender matches the query gender, the facility may assign a higher score than when the there is no match or when the gender of the candidate is unknown. In some embodiments, when a candidate record indicates that a candidate uses gender disguises or aliases, the facility may assign the same score regardless of whether the query gender is male, female, or unknown.

At block 320b, the facility calculates a DOB score based on how closely the candidate's DOB matches the query DOB. The candidate's DOB may match the query DOB exactly or approximately. In some embodiments, the facility uses a fuzzy matching algorithm to calculate the DOB score. For example, when the candidate's DOB matches a portion of the query DOB (e.g., day and month), the facility may assign a higher score than when there is no match. In some embodiments, the facility may assume a match for a portion of the query DOB when the query DOB is not within an acceptable range. For example, when the query DOB is Mar. 32, 1980, the facility may assign the same score to all identified candidates having a DOB in March 1980.

At block 320c, the facility calculates a population score based on the frequency of the query name within the population. For example, a query name having a high frequency within a population (e.g., John Smith) may be scored lower than a query name having a low frequency within the population (e.g., Walentia Knapek). In some embodiments, the population from which the frequency data is derived may be the persons of interest data store from which the candidate records are identified.

At block 320d, the facility calculates a physical description score based on how closely the candidate's physical description matches the query physical description. For example, the facility may compare the candidate's height, weight, eye color, hair color, etc. In some embodiments, when calculating the candidate physical description score, the facility values certain characteristics over others. For example, a match relating to height may be assigned a higher score than a match relating to hair color because hair color (unlike height) is easily changed. In some embodiments, the facility uses fuzzy matching techniques to calculate the physical description score. For example, when the candidate height is within 2-3 inches of the query height, the facility may assign a higher score than when the candidate height outside of an acceptable range. As another example, the facility may assign a high score when the query hair color is red and an identified candidate's hair color is indicated as blonde and/or red.

Other scores may be calculated for the individual. In some embodiments, each candidate score may also include a name matching score indicating how closely the candidate's name matches the query name. The name matching score may be based in whole or in part on the methodology used by the facility at block 315, or it may be generated independently from the facility's identification of candidate records.

At block 325, the facility determines whether there are remaining candidates for which candidate scores have not been calculated. If there are remaining candidates, the facility returns to block 320 to generate the next candidate's score. Otherwise, the facility continues to block 330 to select the candidates for display. In some embodiments, the facility selects candidate for display based on the candidate scores. For example, the facility may select only candidate records scoring above a predefined threshold candidate score. When very few (or no) candidate records are selected for display, the operator may elect to lower the threshold candidate score to select candidates for display. In some embodiments, the number of candidates selected for display is predefined. For example, the facility may be configured to select a minimum or maximum number of candidates for display (with or without regard to a threshold candidate score).

In some embodiments, the number and type of candidates that are selected for display may be based on the retrieved environmental information. By varying the number of candidates that are displayed to the operator, the facility allows a greater or lesser degree of scrutiny to be applied to the individual being verified. In times of an increased threat level, operators may desire to see a greater number of candidates even though it may slow down processing of a particular individual. In times of a reduced threat level, operators may desire to see a lesser number of candidates to increase the number of individuals that can be processed, provided that overall security is not unreasonably lowered. The facility may also select the candidates to display based on the type of threat presented. For example, when the facility detects an AMBER Alert, it may prioritize the selection of records identifying candidates suspected, charged, or convicted of kidnapping or other crimes involving children. As another example, when the facility detects a threat level indicating a severe risk of a terrorist attack, the facility may prioritize the section of records identifying candidate suspected, charged, or convicted of acts involving terrorism.

At block 335, if a selected candidate has more than one criminal or other act, the facility prioritizes the display of the criminal or other acts associated with the selected candidate. In some embodiments, the facility ranks the candidate's criminal or other acts according to a predetermined order. For example, if a record indicates that a candidate is both a terrorist (Terrorist BOLO) and has an outstanding arrest warrant for felony embezzlement (Non-Violent BOLO), the facility may select for display first an indication that the candidate is a Terrorist BOLO and second an indication that the candidate is a Non-Violent BOLO. In some embodiments, candidate's acts are ranked according to the highest threat presented by the candidate. This rank order may be configured dynamically in some circumstances, and/or it may be based in part on environmental information known to the facility. After block 335, the facility returns.

Those skilled in the art will appreciate that the blocks shown in FIG. 3 may be altered in a variety of ways. For example, the order of blocks may be rearranged; substeps may be performed in parallel; shown blocks may be omitted; or other blocks may be included; etc.

FIGS. 4A, 4B, 4C, and 4D show sample screenshots presented as part of the user interface. In particular, displays 400a, 400b, 400c, and 400d are representative screen images that may be displayed by the facility after the scan of an identification record 105 by an operator of scanning device 100. Candidate records 405a, 405b, 405c, . . . 405z have been identified and selected for display by the facility based at least in part on the scanned machine-readable identification information 110. An image of each candidate may be displayed, along with one or more pieces of data that may be used to identify the candidate. For example, the first name, last name, date of birth, age, sex, and other features may be displayed to the operator. In addition, the highest priority criminal or other act selected by the facility is displayed to the operator. The operator may select other acts associated with the candidate by selecting a forward control 425 or backward control 430.

Figure 4A:
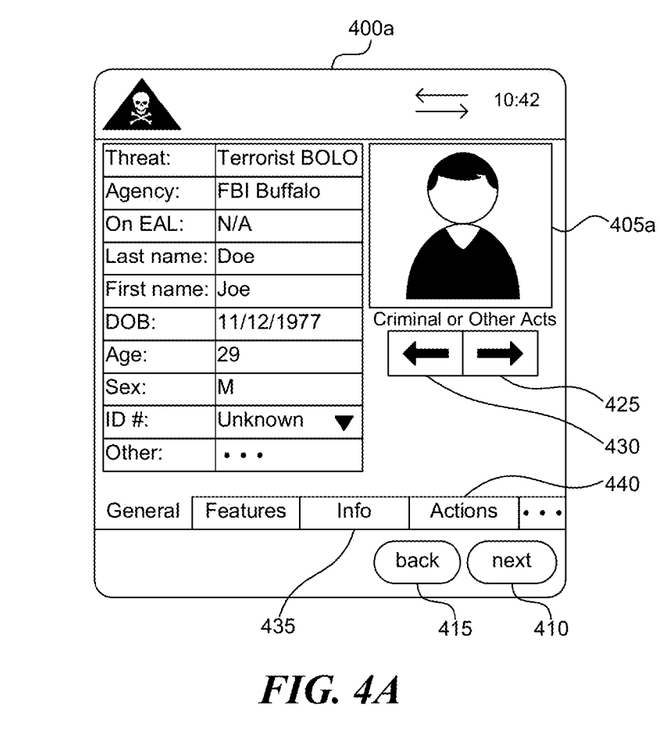
FIGS. 4A, 4B, 4C, and 4D are screenshots of a user interface of the scanning device.
Figure 4B:
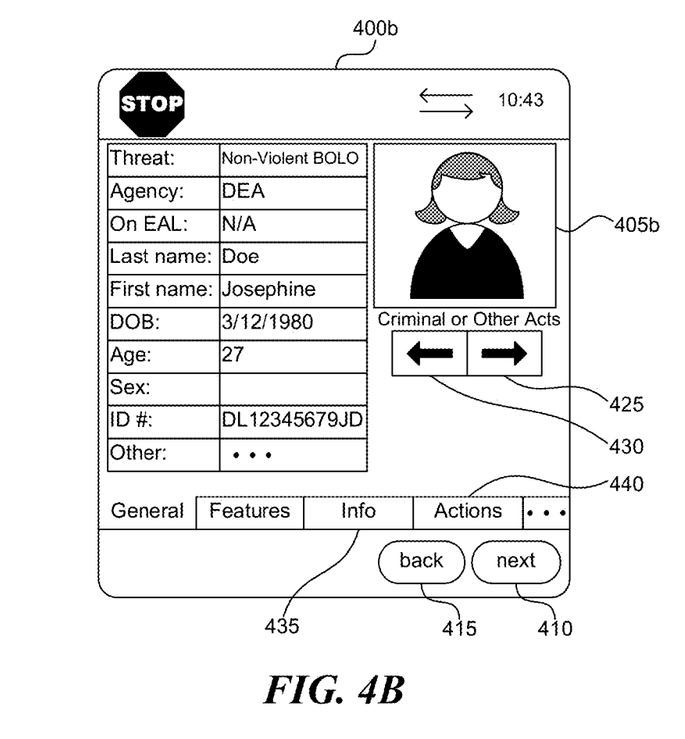

The operator can navigate among various candidate records that are chosen for display by the facility using controls 410 and 415. Pressing the next control 410 causes the operator to see the next candidate selected for display by the facility. Pressing the back control 415 causes the operator to see the previous candidate selected for display. One skilled in the art will appreciate that the user interface could be implemented in a variety of ways to enable an operator to navigate among records. Scroll bars, for example, could be provided. FIGS. 4A and 4B show how an operator navigated from a first record 405a shown in display 400a to a second record 405b shown in display 400b using the control 410 of display 400a.

Figure 4C:
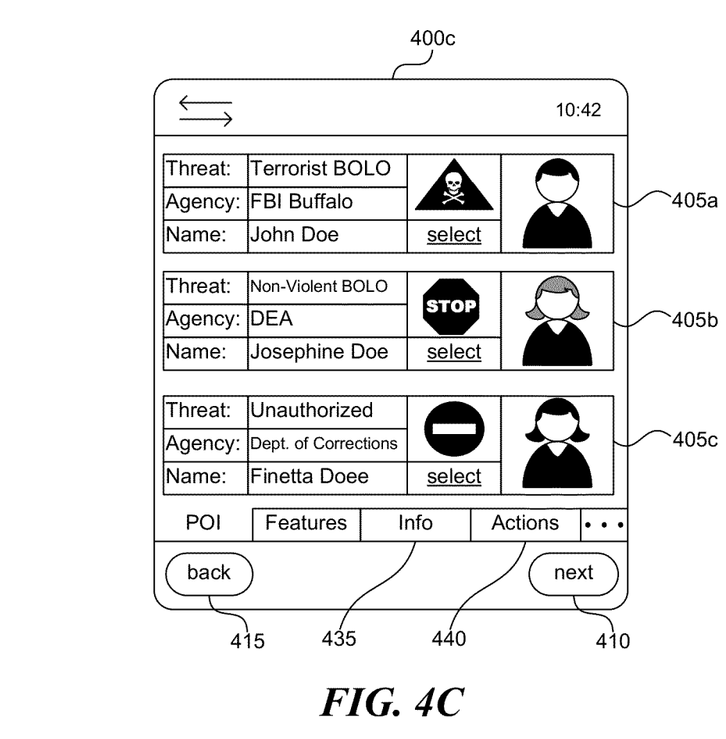
Figure 4D:
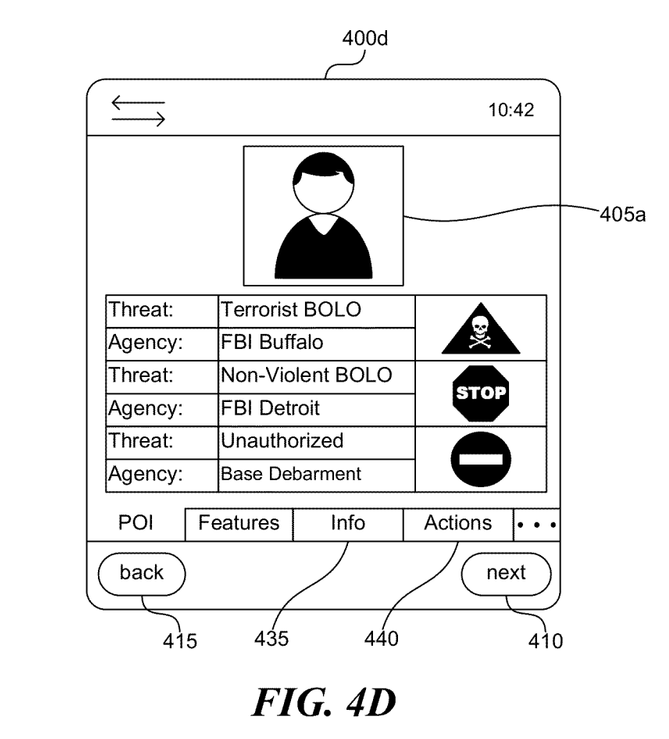

In some embodiments, the operator establishes preferences by providing an operator profile indicating the operator's preferred display views and/or display controls. For example, an operator may indicate that he or she prefers to view a single matching candidate record and a single act per display (as is shown in FIGS. 4A and 4B). As another example, the operator may indicate that he or she prefers to view multiple matching candidate records and a single act for each candidate per display (as shown in FIG. 4C), or a single matching candidate record and multiple acts per display (as shown in FIG. 4D). One skilled in the art will understand that an operator may establish a variety of viewing preferences. Some operators may prefer to switch between views, such that the first display provides an overview of matching records (as shown in FIG. 4C), while subsequent views permit the operator to drill down into the details of each record (as shown in FIGS. 4A, 4B, and 4D).

In some embodiments, the operator can add (or delete) display fields, such as a field that shows the candidate score (not shown). The operator may also establish a display preference that does not display fields for which the information in unknown to the facility. For example, if this display preference were activated for display 400a, the ID# field for record 405a would not display because the facility does not have an ID number associated with that candidate.

In some embodiments, additional information describing the threat or threats presented by a candidate may be provided by the facility. For example, the operator may learn additional details regarding the criminal or other acts of a candidate by using a control 435 to navigate to a detailed record display (not shown). In some embodiments, these details are retrieved dynamically by the facility from a remote service when they are requested by the operator. In other embodiments, these details (or details for particular types of threats) are stored locally on the scanning device.

In some embodiments, an operator may take an action after viewing the candidate record, such as detaining the individual or taking a picture of the individual. When the operator takes an action based upon the query results, the operator may record the actions taken by navigating to a display that provides an input mode (not shown) using control 440. For example, the operator may record a description of the circumstances under which he or she has detained Joe Doe. In some embodiments, the facility may inform the relevant authorities of the actions taken by the operator. In some embodiments, the facility automatically informs some or all relevant authorities when the operator indicates that actions have been taken with respect to a particular candidate record. For example, when the operator indicates that Joe Doe has been detained, the facility may transmit a message to the FBI agencies in Buffalo and Detroit if Joe Doe is on a list of parties wanted by the FBI.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computing system of identifying and displaying one or more persons of interest that may reflect the identity of an individual, comprising:
   receiving, by the computing system, identification information associated with an individual;
   receiving, by the computing system, environmental information, wherein the environmental information is indicative of a level of scrutiny that is to be applied to the received identification information;
   comparing, by the computing system, the received identification information with candidate information associated with each of a plurality of candidates;
   identifying, by the computing system, one or more of the plurality of candidates as persons of interest that may reflect the identity of the individual based at least in part on the comparison of the received identification information and the candidate information associated with each of the plurality of candidates; and
   causing, by the computing system, one or more of the identified persons of interest to be displayed, wherein the number of displayed persons of interest is determined based at least in part on the level of scrutiny indicated by the environmental information.

2. The method of claim 1 wherein the identification information is received from a portable identification device.

3. The method of claim 2 wherein two or more identified persons of interest are displayed on a single display screen of the portable identification device.

4. The method of claim 2 wherein an operator of the portable device can configure the number of displayed candidates.

5. The method of claim 1 further comprising:
   selecting, by the computing system, one or more acts associated with each identified person of interest for which the person of interest is suspected, charged, or convicted; and
   ranking, by the computing system, the one or more selected acts.

6. The method of claim 5 wherein the selected acts are ranked based upon the received environmental information.

7. The method of claim 5 further comprising displaying, by the computing system, the one or more identified persons of interest, wherein each displayed person of interest includes an indication of at least one of the selected acts associated with the person of interest.

8. The method of claim 1 wherein the comparison of the candidate information and the received information comprises comparing at least a portion of the candidate information with a portion of the individual identification information.

9. The method of claim 8 wherein the portion of the candidate information matches the portion of the individual identification information.

10. The method of claim 1 further comprising identifying, by the computing system, the plurality of candidates based in part by the received environmental information.

11. The method of claim 1 wherein the environmental information comprises an alert issued by a government authority.

12. The method of claim 11 wherein the alert indicates a probability of a terrorist attack or an AMBER Alert.

13. The method of claim 1 wherein the number of identified candidates is based in part on the received environmental information.

14. The method of claim 1, wherein a greater number of persons of interest are displayed when the environmental information indicates a high level of scrutiny, and a lesser number of persons of interest are displayed when the environmental information indicates a low level of scrutiny.

15. A system for identifying one or more persons of interest that may reflect the identity of an individual, comprising:
   a receiver configured to:
      receive identification information associated with an individual; and
      receive environmental information, wherein the environmental information is indicative of a level of scrutiny that is to be applied to the received identification information;
   a processing component configured to:
      compare the received identification information with candidate information associated with each of a plurality of candidates;
      identify one or more of the plurality of candidates as persons of interest that may reflect the identity of the individual based at least in part on the comparison of the received identification information and the candidate information associated with each of the plurality of candidates; and
      cause one or more of the identified persons of interest to be displayed, wherein the number of displayed persons of interest is determined based at least in part on the level of scrutiny indicated by the environmental information.

16. The system of claim 15 wherein the identification information is received from a portable identification device.

17. The system of claim 15 wherein two or more identified persons of interest are displayed on the display screen of the portable identification device.

18. The system of claim 15 wherein the processing component is further configured to select one or more acts associated with each identified person of interest for which the person of interest is suspected, charged, or convicted, and ranks the one or more selected acts.

19. The system of claim 18 wherein the selected acts are ranked based upon the received environmental information.

20. The system of claim 18 wherein each displayed person of interest includes an indication of at least one of the selected acts associated with the person of interest.

21. The system of claim 15 wherein the processing component is further configured to identify the plurality of candidates based in part by the received environmental information.

22. The system of claim 15 wherein the environmental information comprises an alert issued by a government authority.

23. The system of claim 22 wherein the alert indicates a probability of a terrorist attack or an AMBER Alert.

24. The system of claim 15 wherein the number of identified candidates is based in part on the received environmental information.

25. The system of claim 15, wherein a greater number of persons of interest are displayed when the environmental information indicates a high level of scrutiny, and a lesser number of persons of interest are displayed when the environmental information indicates a low level of scrutiny.

26. A non-transitory computer-readable storage medium containing instructions for:
   receiving identification information associated with an individual;
   receiving environmental information, wherein the environmental information is indicative of a level of scrutiny that is to be applied to the received identification information;

comparing the received identification information with candidate information associated with each of a plurality of candidates;

identifying one or more of the plurality of candidates as persons of interest that may reflect the identity of the individual based at least in part on the comparison of the received identification information and the candidate information associated with each of the plurality of candidates; and causing one or more of the identified persons of interest to be displayed, wherein the number of displayed persons of interest is determined based at least in part on the level of scrutiny indicated by the environmental information.

27. The non-transitory computer-readable medium of claim 26 further comprising:

selecting, by the computing system, one or more acts associated with each identified person of interest for which the person of interest is suspected, charged, or convicted; and ranking, by the computing system, the one or more selected acts.

28. The non-transitory computer-readable medium of claim 27 wherein the selected acts are ranked based upon the received environmental information.

29. The non-transitory computer-readable medium of claim 27 further comprising displaying the one or more identified persons of interest, wherein each displayed person of interest includes an indication of at least one of the selected acts associated with the person of interest.

30. The non-transitory computer-readable medium of claim 26 wherein the comparison of the candidate information and the received information comprises comparing at least a portion of the candidate information with a portion of the individual identification information.

31. The non-transitory computer-readable medium of claim 26 further comprising identifying, by the computing system, the plurality of candidates based in part by the received environmental information.

32. The non-transitory computer-readable medium of claim 26 wherein the environmental information comprises an alert issued by a government authority.

33. The non-transitory computer-readable medium of claim 32 wherein the alert indicates a probability of a terrorist attack or an AMBER Alert.

34. The non-transitory computer-readable medium of claim 26 wherein the number of identified candidates is based in part on the received environmental information.

35. The non-transitory computer-readable medium of claim 26, wherein a greater number of persons of interest are displayed when the environmental information indicates a high level of scrutiny, and a lesser number of persons of interest are displayed when the environmental information indicates a low level of scrutiny.

* * * * *